(12) United States Patent
Zhou et al.

(10) Patent No.: US 8,437,507 B2
(45) Date of Patent: May 7, 2013

(54) INFORMATION PROCESSING DEVICE, INFORMATION PROCESSING METHOD, AND PROGRAM

(75) Inventors: Ning Zhou, Tokyo (JP); Keisuke Yamaoka, Tokyo (JP); Jun Yokono, Tokyo (JP); Yuichi Hasegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 13/035,064

(22) Filed: Feb. 25, 2011

(65) Prior Publication Data

US 2011/0228982 A1  Sep. 22, 2011

(30) Foreign Application Priority Data

Mar. 4, 2010 (JP) ................................ 2010-047780

(51) Int. Cl.
*G06K 9/00* (2006.01)
*H04N 5/225* (2006.01)

(52) U.S. Cl.
USPC .......................................... 382/103; 348/169

(58) Field of Classification Search .................. 382/103, 382/155, 157, 236; 348/169, 170, 171, 172, 348/208.1, 208.2, 208.14, 208.16, 352; 706/12, 706/25
See application file for complete search history.

(56) References Cited

U.S. PATENT DOCUMENTS 7,697,765 B2 *  4/2010  Matsugu et al. .............. 382/225

OTHER PUBLICATIONS

Ying-li Tian et al., "Robust Lip Tracking by Combining Shape, Color and Motion", [online], Carnegie Mellon School of Computer Science, 2000, pp. 6.

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

An information processing device includes a learning image input unit configured to input a learning image, in which a tracked object is captured on different shooting conditions, together with the shooting conditions, a feature response calculation unit configured to calculate a response of one or more integrated features, with respect to the learning image while changing a parameter in accordance with the shooting conditions, a feature learning unit configured to recognize spatial distribution of the one or more integrated features in the learning image based on a calculation result of the response and evaluate a relationship between the shooting conditions and the parameter and a spatial relationship among the integrated features so as to learn a feature of the tracked object, and a feature storage unit configured to store a learning result of the feature.

4 Claims, 7 Drawing Sheets

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program.

2. Description of the Related Art

Such a technique that an object is tracked in a three dimensional space by using an input image (tracking image) from a camera has been widely used. In this technique, a feature of a tracked object is learned by using a learning image (learning stage) and the tracked object included in the tracking image is tracked based on the learned feature of the tracked object (tracking stage). Here, on the learning stage and the tracking stage, a shape feature of the tracked object, a color feature of the tracked object, and a combination of the shape feature and the color feature are used as features of the tracked object (for example, refer to "Robust Lip Tracking by Combining Shape, Color and Motion" by Ying-li Tian et al., [online], Carnegie Mellon School of Computer Science, 2000 [searched on Feb. 1, 2010] internet <URL: http://www.cs.cmu.edu/~face/Papers/accv2000camera.pdf>).

SUMMARY OF THE INVENTION

In related art, when a combination of a shape feature and a color feature of a tracked object is used, the shape feature and the color feature are used separately. That is, the shape feature and the color feature are separately calculated and they are separately weighted by an appropriate weighting coefficient and combined. For example, in "Robust Lip Tracking by Combining Shape, Color and Motion" by Ying-li Tian et al., [online], Carnegie Mellon School of Computer Science, 2000 [searched on Feb. 1, 2010] internet <URL: http://www.cs.cmu.edu/~face/Papers/accv2000camera.pdf>, a color feature of an object is first calculated, and a position of a shape feature of the object is calculated based on the calculation result of the color feature so as to specify a state of the object.

Thus, correlativity between the shape feature and the color feature of the tracked object is not sufficiently considered, and the feature, which is expressed as a combination of the shape feature and the color feature, of the tracked object is not sufficiently considered. Further, a tracking result is varied depending on setting of a weighting coefficient. Therefore, stability (robust property) of the tracking may be degraded.

It is desirable to provide an information processing device, an information processing method, and a program that can enhance stability of tracking.

According to an embodiment of the present invention, there is provided an information processing device including a learning image input unit configured to input a learning image, in which a tracked object is captured on different shooting conditions, together with the shooting conditions, a feature response calculation unit configured to calculate a response of one or more integrated features, which are obtained by at least partially overlapping a shape feature and a color feature of the tracked object, with respect to the learning image while changing a parameter which defines at least one of a position on the learning image, a size, and an angle of the one or more integrated features, in accordance with the shooting conditions, a feature learning unit configured to recognize spatial distribution of the one or more integrated features in the learning image based on a calculation result of the response and evaluate a relationship between the shooting conditions and the parameter and a spatial relationship among the integrated features so as to learn a feature of the tracked object, and a feature storage unit configured to store a learning result of the feature.

According to such configuration, the feature of the tracked object is learned as one or more integrated features which are obtained by at least partially overlapping the shape feature and the color feature of the tracked object. Accordingly, the feature, which is expressed as a combination of the shape feature and the color feature, of the tracked object is sufficiently learned and the shape feature and the color feature do not have to be separately weighted by an appropriate weighting coefficient and combined. Therefore, the tracked object can be stably tracked by using the learning result of the feature on the tracking stage.

The information processing device may further include a tracking image input unit configured to input a tracking image including the tracked object, for each frame, a feature score calculation unit configured to calculate a score of the one or more integrated features while changing a parameter which defines at least one of a position on the tracking image, a size, and an angle of the one or more integrated features, by using a learning result of the one or more integrated features, which are obtained by at least partially overlapping the shape feature and the color feature of the tracked object, as for the tracking image, an existence probability calculation unit configured to calculate probability that the tracked object exists in a predetermined region in the tracking image, and an object tracking unit configured to specify a position of the tracked object in the tracking image based on a calculation result of the score and a calculation result of the existence probability and track the tracked object included in the tracking image.

Accordingly, the tracked object is tracked based on the learning result of the feature which is learned as one or more integrated features which are obtained by at least partially overlapping the shape feature and the color feature of the tracked object. Thus, the tracked object is tracked based on the feature, which is expressed as a combination of the shape feature and the color feature, of the tracked object, so that the shape feature and the color feature do not have to be separately weighted by an appropriate weighting coefficient and combined. Accordingly, the tracked object can be stably tracked.

According to another embodiment of the present invention, there is provided an information processing method including the steps of inputting a learning image, in which a tracked object is captured on different shooting conditions, together with the shooting conditions, calculating a response of one or more integrated features, which are obtained by at least partially overlapping a shape feature and a color feature of the tracked object, with respect to the learning image while changing a parameter which defines at least one of a position on the learning image, a size, and an angle of the one or more integrated features, in accordance with the shooting conditions, recognizing spatial distribution of the one or more integrated features in the learning image based on a calculation result of the response and evaluating a relationship between the shooting conditions and the parameter and a spatial relationship among the integrated features so as to learn a feature of the tracked object, and storing a learning result of the feature.

According to a still another embodiment of the present invention, there is provided a program that makes a computer perform the above-described information processing method. Here, the program may be provided by using a storage medium which can be read out by a computer or may be provided through a communication means.

According to the embodiments of the present invention, the information processing device, the information processing method, and the program that can enhance stability of tracking can be provided.

DESCRIPTION OF THE PREFERRED EMBODIMENTS

Figure 1:
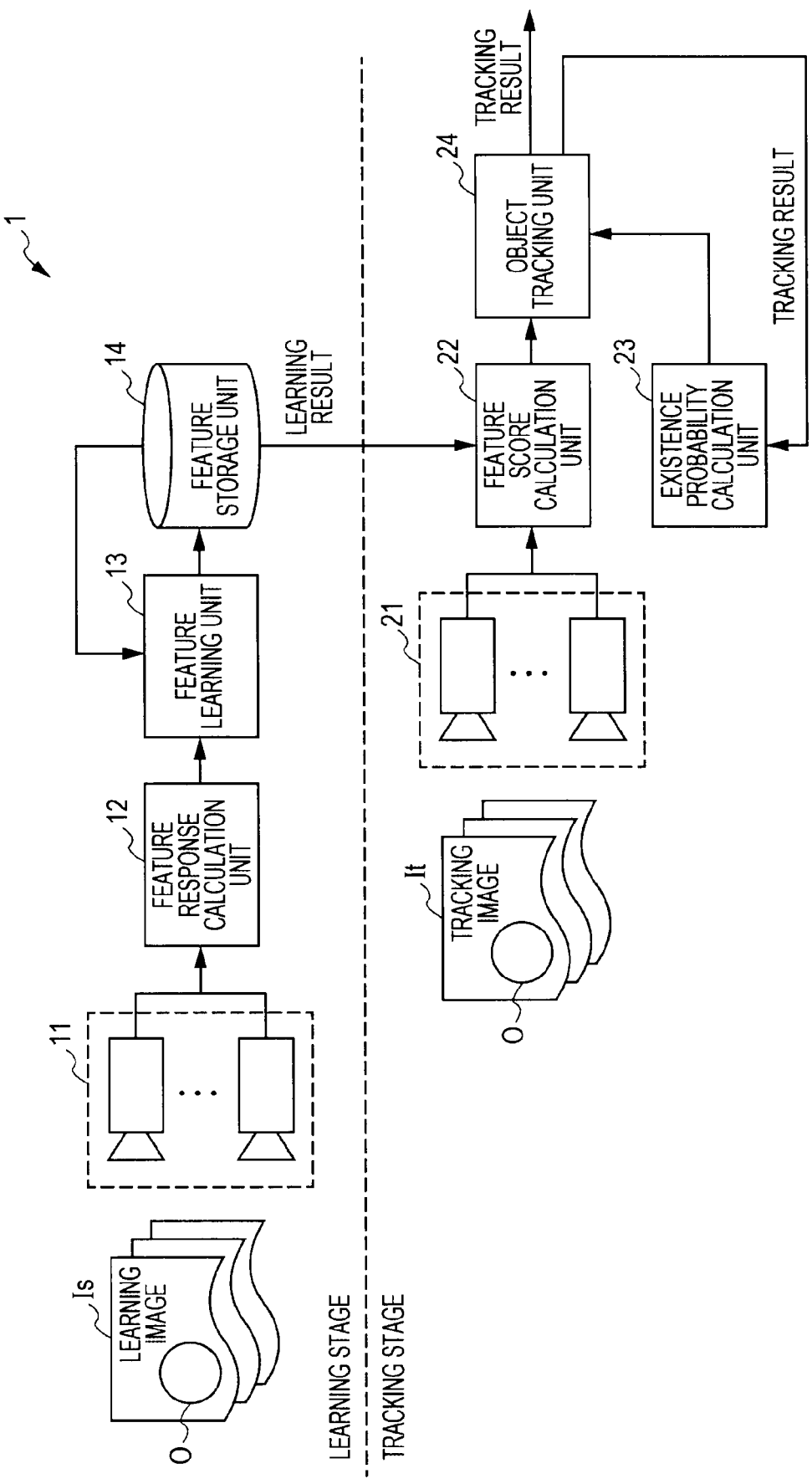
FIG. 1 is a block diagram showing the major functional configuration of an information processing device according to an embodiment of the present invention.

A prefer embodiment of the present invention will be described in detail below with reference to the accompanying drawings. In this specification and the drawings, constituent elements substantially having identical function and configuration are given a same reference character so as to omit duplicative explanation.

[1. Configuration of Information Processing Device 1]

The configuration of an information processing device 1 is first described with reference to FIG. 1. FIG. 1 illustrates the major functional configuration of the information processing device 1.

As shown in FIG. 1, the information processing device 1 includes a learning image input unit 11, a feature response calculation unit 12, a feature learning unit 13, a feature storage unit 14, a tracking image input unit 21, a feature score calculation unit 22, an existence probability calculation unit 23, and an object tracking unit 24.

The learning image input unit 11 is composed of one or more cameras. The learning image input unit 11 receives a labeled learning image Is and supplies the learning image Is to the feature response calculation unit 12. The learning image Is is an image in which a tracked object O is captured on different shooting conditions (a shooting distance, a shooting angle, and the like from each of the cameras of the learning image input unit 11) shown by the label. The learning image Is is inputted as a stereo image for recognition of a position and a shape of the tracked object O which is disposed in a three-dimensional space.

The feature response calculation unit 12 calculates a response (compatibility) with respect to the supplied learning image Is, as a feature of the tracked object O. The feature learning unit 13 learns the feature of the tracked object O which is included in the learning image Is based on a calculation result of the response. Here, the feature of the tracked object O is processed as an integrated feature in which a shape feature and a color feature are integrated.

The shape feature is expressed as an edge, a gradient, a rectangular filter, and the like in a luminance region of the learning image Is. The color feature is expressed as a sum of squared difference (SSD), a histogram, and the like in a local region in a color region of the learning image Is.

The integrated feature is expressed as a combination of the shape feature and the color feature. The integrated feature is expressed such that one or more shape features and one or more color features are overlapped at least partially. Here, correlativity between the shape feature and the color feature is reflected in a part in which the shape feature and the color feature are overlapped each other, and a feature composed of the combination of the shape feature and the color feature is expressed in the part.

The feature storage unit 14 stores feature information of the tracked object O and a learning result of the feature. The feature information of the tracked object O includes the shape feature and the color feature of the tracked object O and the integrated feature composed of the combination of the shape feature and the color feature. The learning result of the feature includes information accumulated on a learning stage as a feature of the tracked object O.

The tracking image input unit 21 is composed of one or more cameras. The tracking image input unit 21 receives a tracking image It for each frame and supplies the tracking image It to the feature score calculation unit 22. The tracking image It is an image including the tracked object O which moves relatively to the tracking image input unit 21. The tracking image It is inputted as a stereo image for recognition of a position and a shape of the tracked object O which is disposed in the three-dimensional space.

The feature score calculation unit 22 calculates a score (compatibility) of a feature of the supplied tracking image It based on the learning result of the feature. The feature score calculation unit 22 calculates a feature of the tracked object O included in the tracking image It. Here, the feature of the tracked object O is processed as an integrated feature which is obtained by integrating a shape feature and a color feature.

The existence probability calculation unit 23 calculates probability that the tracked object O exists in a predetermined region in the tracking image It. The object tracking unit 24 specifies a position of the tracked object O included in the tracking image It based on a calculation result of the score and a calculation result of the existence probability so as to track the tracked object O and output a tracking result. Here, the tracked object O is tracked with a particle filter based on the calculation result of the feature.

Here, at least a part of the functional configuration described above may be realized by software (program) which is operated in the information processing device 1 or may be realized by hardware. In a case where the configuration is realized by software, the program may be preliminarily stored in the information processing device 1 or may be supplied from the outside.

[2. Operation of Information Processing Device 1]

Figure 2:
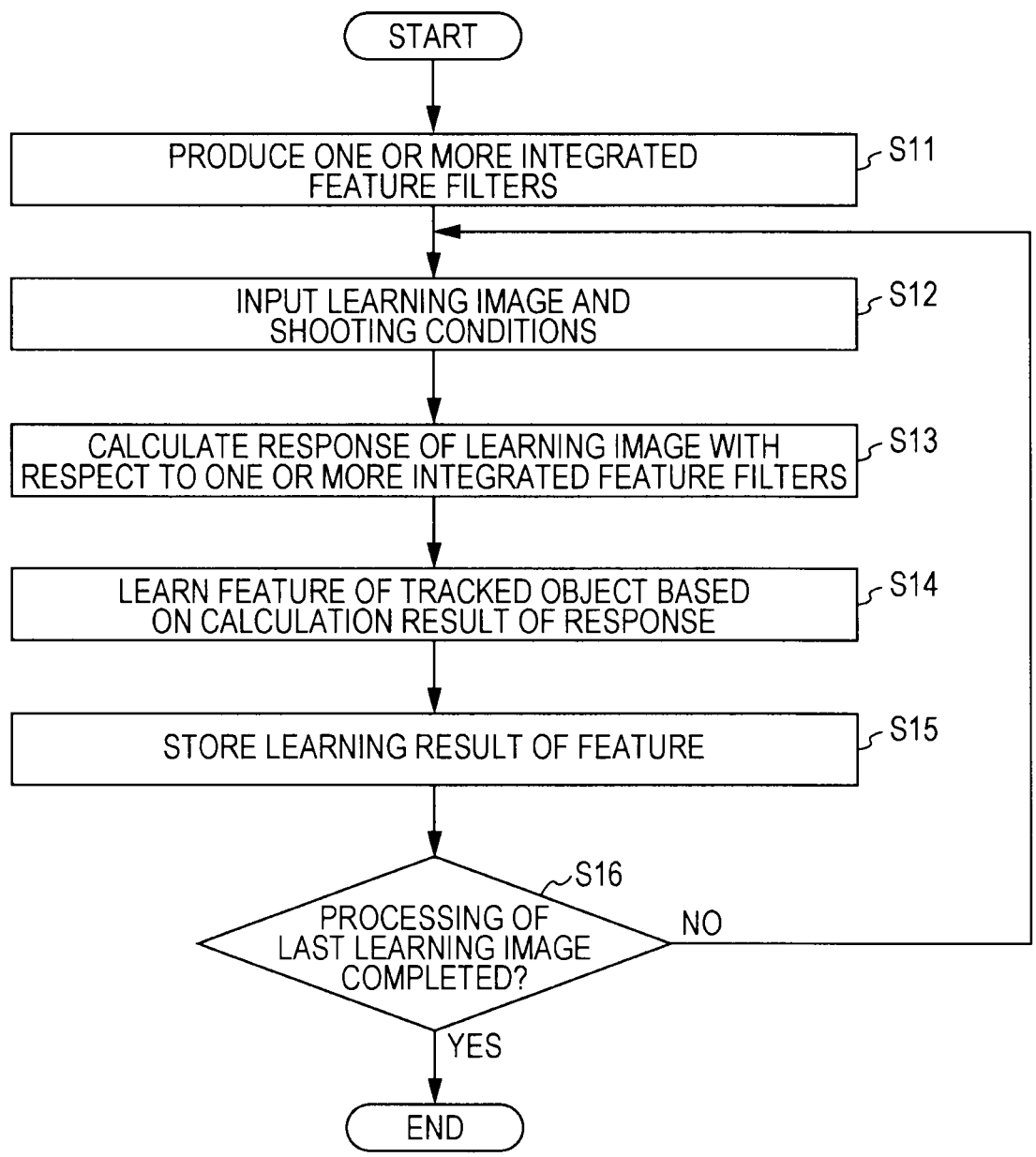
FIG. 2 is a flowchart showing an operation procedure on a learning stage of the information processing device.
Figure 3:
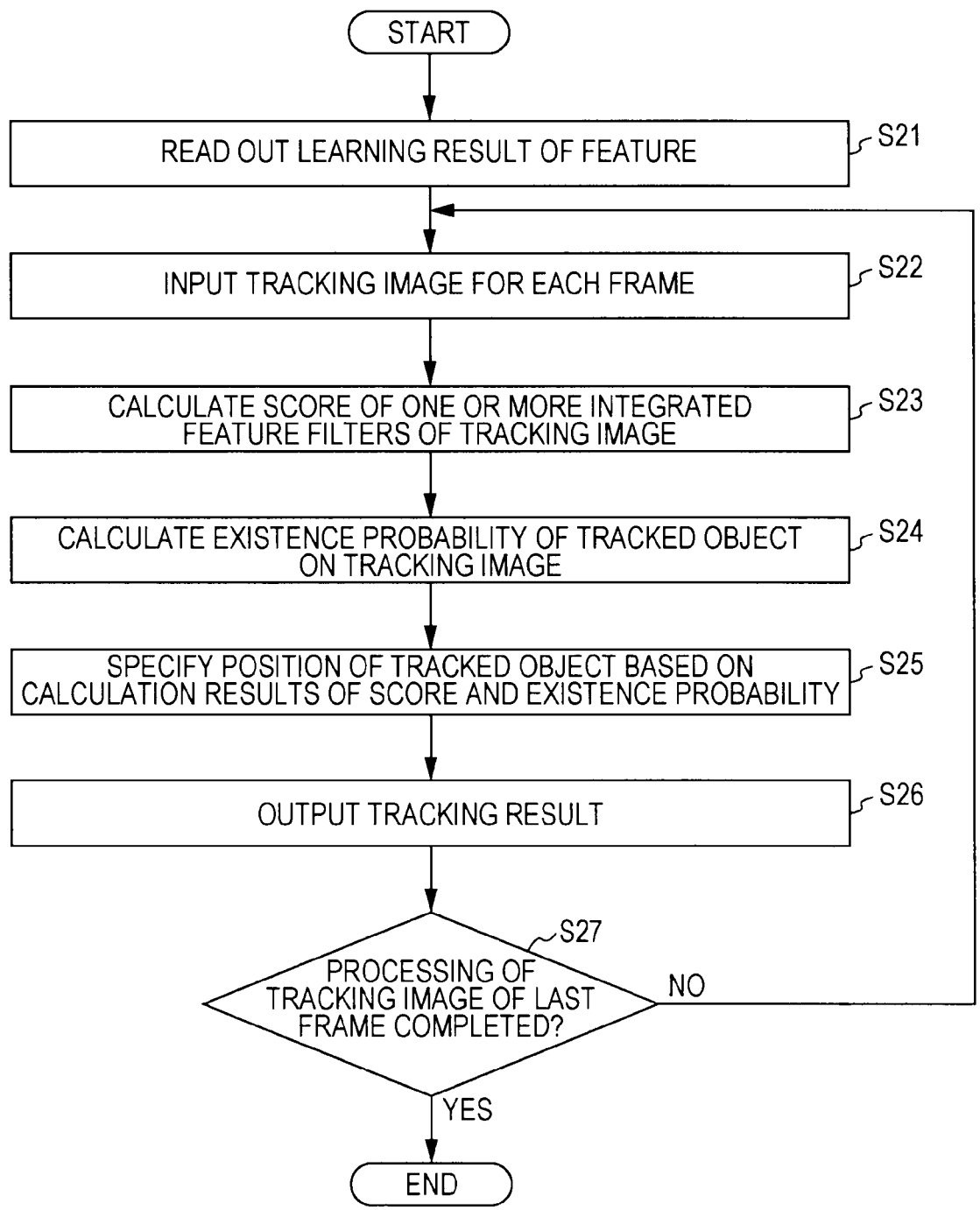
FIG. 3 is a flowchart showing an operation procedure on a tracking stage of the information processing device.

An operation of the information processing device 1 is next described with reference to FIGS. 2 to 6B. FIGS. 2 and 3 respectively illustrate an operational procedure on a learning stage and an operational procedure on a tracking stage of the information processing device 1.

The information processing device 1 performs different operations on the learning stage and the tracking stage. On the learning stage, a feature of the tracked object O is learned by using the learning image Is. On the tracking stage, the tracked object O included in the tracking image It is tracked based on the learning result of the feature. In the following description, a case where the learning stage is performed off-line is described. However, the learning stage may be performed on-line, that is, during the tracking stage.

As shown in FIG. 2, on the learning stage, one or more integrated feature filters F expressing the feature of the tracked object O are first produced (step S11). The integrated feature filters F which are produced are stored as feature information of the tracked object O.

Figure 4:
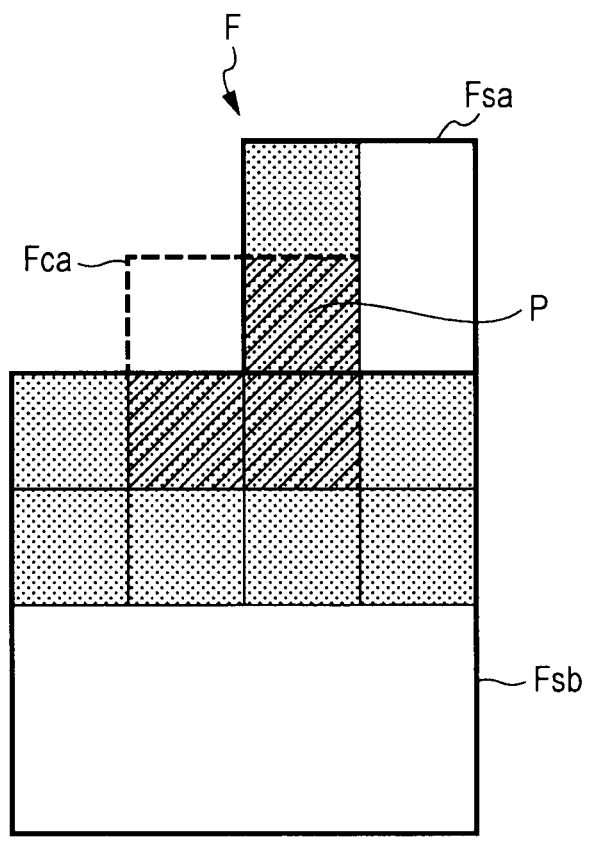
FIG. 4 illustrates an example of an integrated feature filter.

FIG. 4 illustrates an example of the integrated feature filter F. As shown in FIG. 4, the integrated feature filter F is produced by combining one or more shape feature filters Fs and one or more color feature filters Fc. In an example shown in FIG. 4, the integrated feature filter F is produced by combining shape feature filters Fsa and Fsb and a color feature filter Fca. The integrated feature filter F is produced by at least partially overlapping the shape feature filter Fs and the color feature filter Fc. In the example shown in FIG. 4, an integrated feature obtained by integrating the shape feature and the color feature is shown in a region P (a region expressed by diagonal lines) on which the filter Fsa and the filter Fca are overlapped each other and the filter Fsb and the filter Fca are overlapped each other.

A shape of each of the filters Fs and Fc is not limited to a rectangular shape. Further, the shape feature filter Fs and the color feature filter Fc may be combined as one filter to one filter, one filter to plurality of filters, plurality of filters to one filter, or plurality of filters to plurality of filters. Further, in the integrated feature filter F, filters Fs and Fc having different sizes from each other may be combined or the filters Fs and Fc may be combined by different angles from each other.

Figure 5:
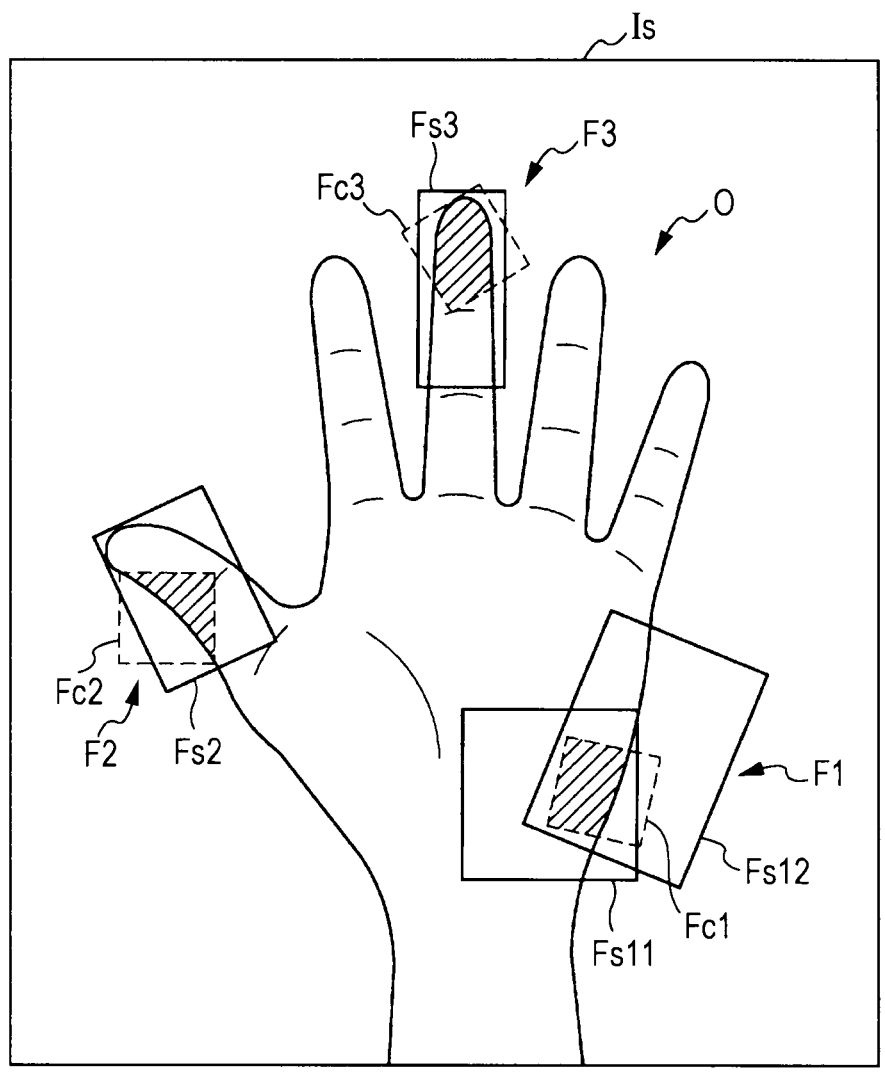
FIG. 5 illustrates an example that a feature of a tracked object is expressed by an integrated feature filter.

FIG. 5 illustrates an example in which a feature of a tracked object O is expressed by an integrated feature filter F. In the example of FIG. 5, a feature of a hand which is an example of the tracked object O is expressed by a first integrated feature filter F1 which shows a part in a palm, a second integrated feature filter F2 which shows a part of thumb, and a third integrated feature filter F3 which shows a part of a middle finger. The first integrated feature filter F1 is composed of two shape feature filters Fs11 and Fs12, and one color feature filter Fc1. The second integrated feature filter F2 is composed of a shape feature filter Fs2 and a color feature filter Fc2, and the third integrated feature filter F3 is composed of a shape feature filter Fs3 and a color feature filter Fc3.

Second, a learning image Is in which the tracked object O is captured on different shooting conditions is inputted together with a label which shows the shooting conditions (S12). The learning image Is includes a feature of the tracked object O which is captured on the shooting conditions which are shown by the label. Information included in the learning image Is is projected from a three-dimensional-space coordinate to a two-dimensional-space coordinate.

Third, a response (compatibility) of the learning image Is which is projected, with respect to one or more integrated feature filters F (a group of integrated feature filters F) is calculated (S13). In terms of the integrated feature filter F, a response between the whole of the integrated feature filters F and the learning image Is is calculated by calculating a response between the shape feature filter Fs constituting the integrated feature filter F and the learning image Is and a response between the color feature filter Fc constituting the integrated feature filter F and the learning image Is. A response of one or more integrated feature filters F, with respect to the learning image Is is calculated while changing a parameter such as a position on the learning image Is, a size, or an angle in accordance with the shooting conditions which are shown by the label.

Here, a response of the shape feature is calculated by using an edge, a gradient, a rectangular filter, and the like in the luminance region of the learning image Is. Further, the response of the shape feature may be calculated by using a feature of histograms of oriented gradients (HOG) and a support vector machine (SVM). A response of the color feature is calculated by using an SSD, a histogram, and the like in the local region in the color region of the learning image Is.

Fourth, a feature of the tracked object O is learned based on a calculation result of the response (S14). Matching between the feature of the tracked object O included in the learning image Is and the integrated feature filter F is executed based on the calculation result of the response on the learning image Is, whereby a space distribution of the integrated feature on the learning image Is can be recognized. The feature of the tracked object O is learned by evaluating a relationship between the shooting conditions shown by the label and the parameter such as a position on the learning image Is, a size, or an angle of the integrated feature, and a spatial relationship among integrated features.

Fifth, the learning result of the feature is stored (S15). The learning result of the feature is referred again when a spatial relationship among the integrated features and the like in other learning image Is are evaluated. That is, consideration of the former learning result enables efficient learning of the feature.

On the learning stage, the feature of the tracked object O is learned as an integrated feature by repeating the processing of steps S12 to S15 until processing of the last learning image Is is completed (S16). Accordingly, information how the feature of the tracked object O which is captured on the different shooting conditions is expressed is accumulated as the learning result of the feature.

Here, the feature of the tracked object O is learned as the integrated feature in which the shape feature and the color feature are integrated. Therefore, the feature, which is expressed as the combination of the shape feature and the color feature, of the tracked object O is sufficiently learned, so that these features do not have to be separately weighted by an appropriate weighting coefficient and combined. Accordingly, on the tracking stage, the tracked object O can be stably tracked by using the learning result of the feature.

On the other hand, as shown in FIG. 3, the learning result of the feature is first read out on the tracking stage (S21). That is, information for specifying the feature of the tracked object O which is captured in the tracking image It on the different shooting conditions is read out.

Second, the tracking image It including the tracked object O is inputted for each frame (S22). The tracking image It includes an image of the tracked object O which moves relatively to the tracking image input unit 21. Information included in the tracking image It is projected from the three-dimensional-space coordinate to the two-dimensional-space coordinate.

Third, a score (compatibility) of one or more integrated feature filters F (a group of the integrated feature filters F) in the tracking image It which is inputted is calculated (S23). In terms of the integrated feature filter F, a score of the whole of the integrated feature filters F can be calculated by calculating scores of the shape feature filter Fs and the color feature filter Fc that constitute the integrate feature filter F. A score of one or more integrated feature filters F is calculated while changing a parameter such as a position on the tracking image It, a size, or an angle.

Here, a score of the shape feature filter Fs is calculated by using an edge, a gradient, a rectangular filter, and the like in the luminance region of the tracking image It, and a score of the color feature filter Fc is calculated by using an SSD, a histogram, and the like in the local region in the color region of the tracking image It.

Fourth, probability that the tracked object O exists in a predetermined region in the tracking image It is calculated (S24). The existence probability of the tracked object O is calculated with a particle filter. The particle filter is a technique in which the tracked object O is expressed as discrete probability density by multiple hypothesis groups having state quantity and likelihood and the discrete probability density is propagated with a state transition model so as to track an object. In an application of the particle filter, an operation of the tracked object O is preliminarily modeled by using an evaluation model and the like so as to form multiple hypothesis groups.

Fifth, a position of the tracked object O is specified based on the calculation results of the score and the existence probability (S25). The position of the tracked object O is specified as a region of which the existence probability of the tracked object O is the highest among regions of which a score of the integrated feature filter F exceeds a predetermined threshold value. The specified position is used for calculating probability that the tracked object O exists in a predetermined region in a tracking image It for the following frame.

Sixth, the specified position of the tracked object O is outputted as a tracking result (S26).

Figure 6A:
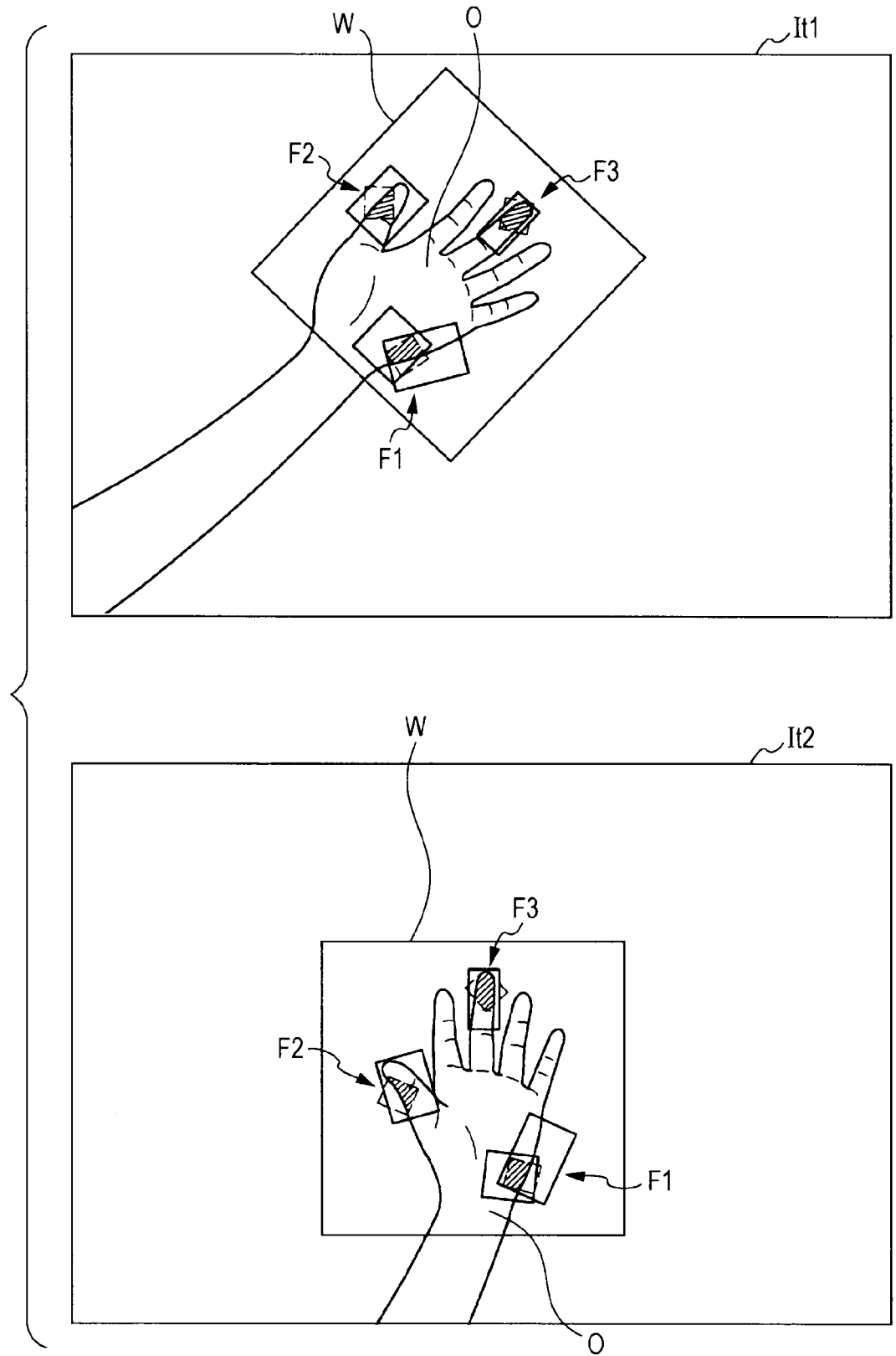
FIG. 6A illustrates an example of a tracking result of the tracked object (1;2)
Figure 6B:
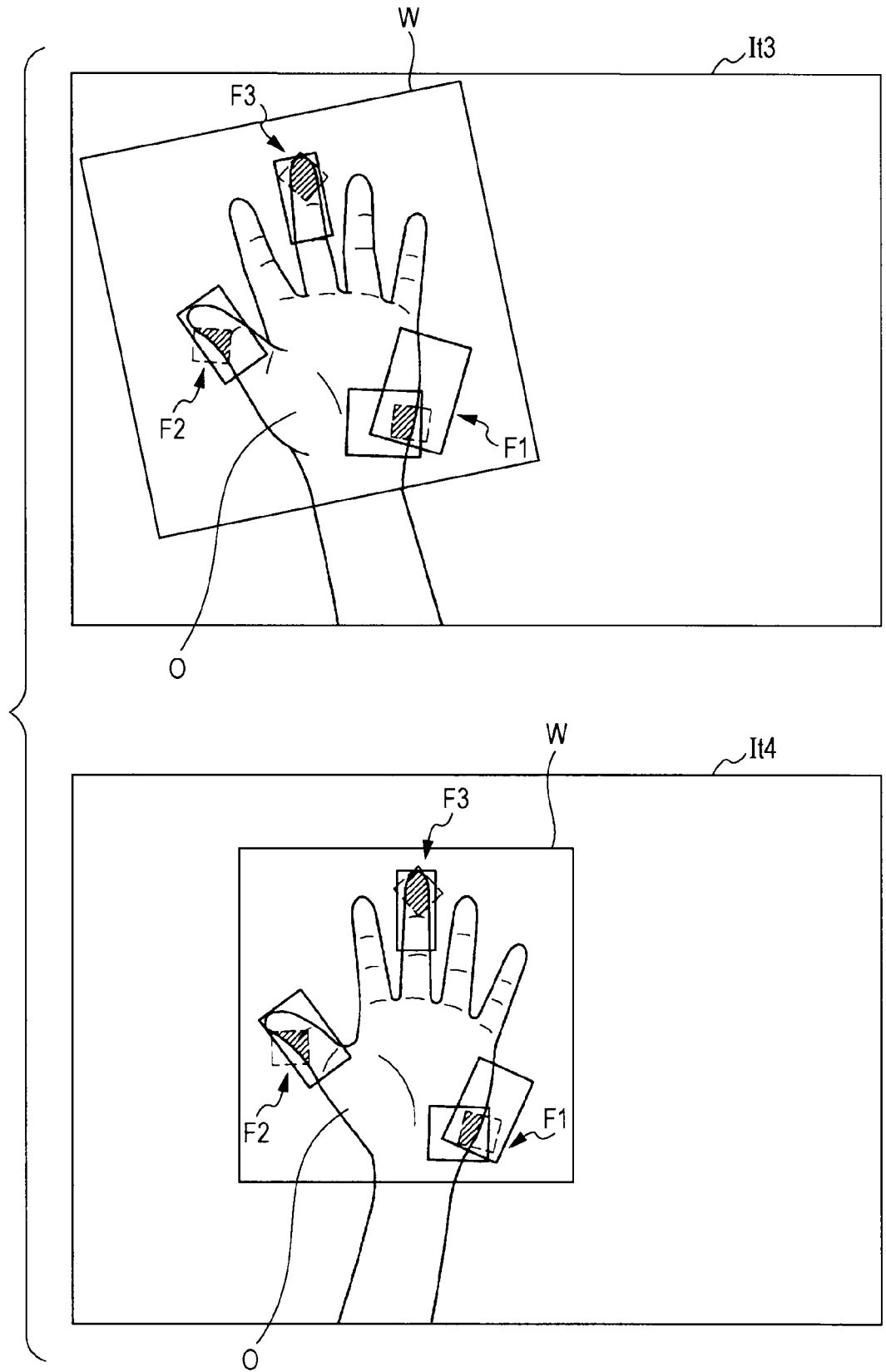
FIG. 6B illustrates an example of a tracking result of the tracked object (2;2).

FIGS. 6A and 6B illustrate an example of the tracking result of the tracked object O. In the example shown in FIGS. 6A and 6B, a hand which is an example of the tracked object O is tracked in tracking images It1 to It4 (the tracking images It1 to It4 are not consecutive frames). The feature of the tracked object O is expressed by the first to third integrated feature filters F1 to F3 shown in FIG. 5.

The tracked object O moves three-dimensionally with respect to the tracking image input unit 21. On the tracking image It, scores of the first to third integrated feature filters F1 to F3 are calculated based on the learning result of the feature. Further, the existence probability of the tracked object O is calculated with the particle filter. Accordingly, the position of the tracked object O included in the tracking image It is specified, whereby the tracked object O can be tracked. In FIGS. 6A and 6B, the position of the tracked object O is specified by a tracking window W.

On the tracking stage, the tracked object O which moves relatively to the tracking image input unit 21 is tracked by repeating processing of steps S22 to S26 until processing of a tracking image It of the last frame is completed (S27).

On the tracking stage, the tracked object O is tracked based on the learning result of the feature which is learned as the integrated feature in which the shape feature and the color feature are integrated. Thus, the tracked object O is tracked based on the feature, which is expressed as the combination of the shape feature and the color feature, of the tracked object O, so that these features do not have to be separately weighted by an appropriate weighting coefficient and combined. Accordingly, the tracked object O can be stably tracked on the tracking stage.

The preferred embodiment of the present invention is described in detail above with reference to the accompanying drawings, but the embodiment of the present invention is not limited to the above example. It is apparent for those skilled in the art that various modifications and alterations may occur within the scope of the technical idea according to embodiments of the present invention and it should be understood that these modifications and alterations be within the technical scope of the present invention.

For example, the learning stage and the tracking stage are performed by a single information processing device 1 in the above embodiment, but may be performed by separate information processing devices.

Further, the integrated feature is obtained by combining the shape feature and the color feature in the above embodiment. However, the shape feature may be substituted by a feature of histograms of oriented gradients (HOG) or a feature of scale-invariant feature transform (SIFT), and the color feature may be substituted by Texton feature.

The present application contains subject matter related to that disclosed in Japanese Priority Patent Application JP 2010-047780 filed in the Japan Patent Office on Mar. 4, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
a learning image input unit configured to input a learning image, in which a tracked object is captured on different shooting conditions, together with the shooting conditions;
a feature response calculation unit configured to calculate a response of one or more integrated features, the integrated features being obtained by at least partially overlapping a shape feature and a color feature of the tracked object, with respect to the learning image while changing a parameter, the parameter defining at least one of a position on the learning image, a size, and an angle of the integrated features, in accordance with the shooting conditions;
a feature learning unit configured to recognize spatial distribution of the one or more integrated features in the learning image based on a calculation result of the response and evaluate a relationship between the shooting conditions and the parameter and a spatial relationship among the integrated features so as to learn a feature of the tracked object; and
a feature storage unit configured to store a learning result of the feature.

2. The information processing device according to claim 1, further comprising:
a tracking image input unit configured to input a tracking image including the tracked object, for each frame;
a feature score calculation unit configured to calculate a score of the one or more integrated features while changing a parameter, the parameter defining at least one of a position on the tracking image, a size, and an angle of the one or more integrated features, by using a learning result of the one or more integrated features, the integrated features being obtained by at least partially overlapping the shape feature and the color feature of the tracked object, as for the tracking image;
an existence probability calculation unit configured to calculate probability that the tracked object exists in a predetermined region in the tracking image; and
an object tracking unit configured to specify a position of the tracked object in the tracking image based on a calculation result of the score and a calculation result of the existence probability and track the tracked object included in the tracking image.

3. An information processing method, comprising the steps of:
inputting a learning image, in which a tracked object is captured on different shooting conditions, together with the shooting conditions;
calculating a response of one or more integrated features, the integrated features being obtained by at least partially overlapping a shape feature and a color feature of the tracked object, with respect to the learning image while changing a parameter, the parameter defining at least one of a position on the learning image, a size, and an angle of the one or more integrated features, in accordance with the shooting conditions;

recognizing spatial distribution of the one or more integrated features in the learning image based on a calculation result of the response and evaluating a relationship between the shooting conditions and the parameter and a spatial relationship among the integrated features so as to learn a feature of the tracked object; and storing a learning result of the feature.

4. A non-transitory computer readable medium having a program stored therein that when executed by a computer causes the computer to perform an information processing method comprising the steps of:

inputting a learning image, in which a tracked object is captured on different shooting conditions, together with the shooting conditions;

calculating a response of one or more integrated features, the integrated features being obtained by at least partially overlapping a shape feature and a color feature of the tracked object, with respect to the learning image while changing a parameter, the parameter defining at least one of a position on the learning image, a size, and an angle of the one or more integrated features, in accordance with the shooting conditions;

recognizing spatial distribution of the one or more integrated features on the learning image based on a calculation result of the response and evaluating a relationship between the shooting conditions and the parameter and a spatial relationship among the integrated features so as to learn a feature of the tracked object; and storing a learning result of the feature.

* * * * *